Dec. 15, 1936. W. S. BURN 2,064,371
PISTON CONSTRUCTION OF INTERNAL COMBUSTION ENGINES
Filed Nov. 13, 1935
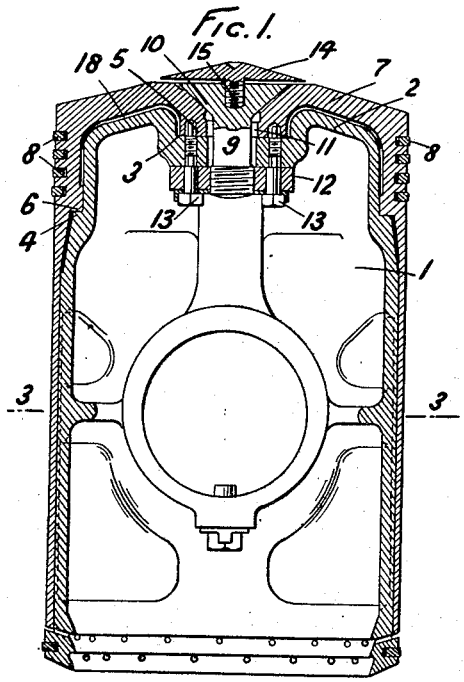
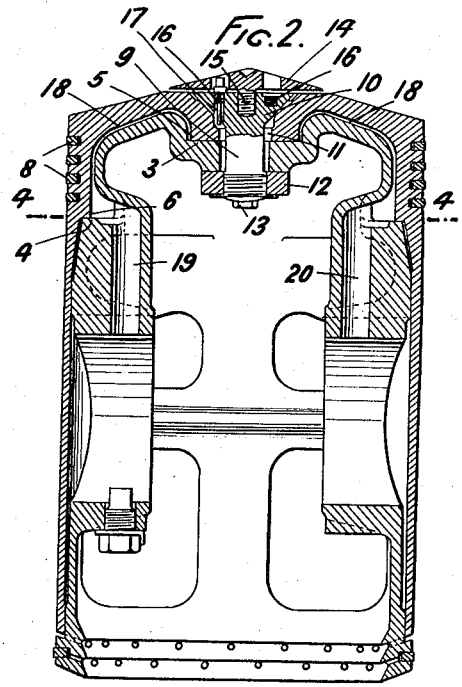
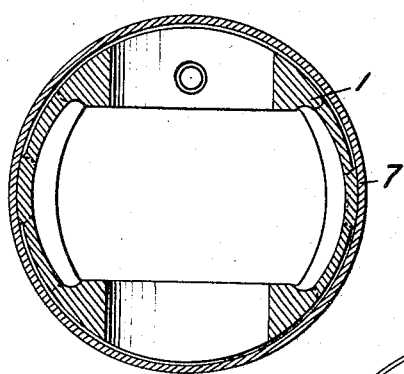
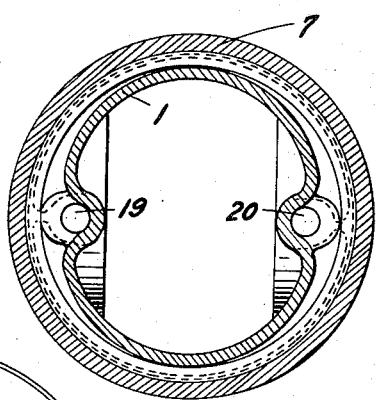
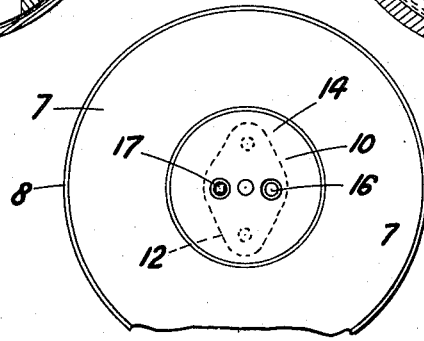
Inventor
Walter Scott Burn
By Dowell & Dowell
Attorneys Patented Dec. 15, 1936

2,064,371

UNITED STATES PATENT OFFICE 2,064,371

PISTON CONSTRUCTION OF INTERNAL COMBUSTION ENGINES

Walter Scott Burn, Hartlepool, England, assignor to The National Gas and Oil Engine Company Limited, Alfred Bickerton Balmford, Ashton-under-Lyne, England, and Walter Scott Burn, Hartlepool, England Application November 13, 1935, Serial No. 49,633
In Great Britain November 13, 1934

7 Claims. (Cl. 123—176)

This invention relates to pistons for internal combustion engines of the two-stroke single-acting type especially, and more particularly to pistons comprising separable screw-connected parts whereby the skirt and head can be removed while the gudgeon-carrying part is left in position within the cylinder.

The object of the invention is to provide an improved piston construction for oil-cooled engines of the class referred to which may run at relatively high speed.

Other important and related objects, also included, will be made to appear hereinafter.

The piston of the invention comprises three main portions; an outer shell in which is incorporated the piston skirt, piston ring grooves and the piston head through which the cylinder pressures are transmitted; an inner structure primarily for supporting the gudgeon pin; and a single central bolt for connecting the outer and inner portions. The outer main or shell portion has shouldering engaged by separate shouldered regions on the inner gudgeon-carrying portion in such manner that a space results, both to and from which cooling oil is conducted by way of the gudgeon pin, in order to secure a high velocity cooling effect with an absence of ribs or pockets. The bolt portion connecting these outer and inner portions does so with the aid of a nut arranged beyond an opening in one of the shouldered regions of the inner part, through which the bolt stem passes freely, and said nut is held loosely in place by suitable collar bolts.

It is accordingly possible to make the outer part of a material having good wearing properties such as the skirt and ring grooves call for, cast iron being a suitable material for the lower speeds and a hard aluminium alloy being a suitable material for the higher speeds. The material of the inner portion or gudgeon pin support is such as to be light in weight, yet strong enough to transmit the working loads. Aluminium or other light alloys, for example, will enable inertia forces to be reduced to a minimum.

One way in which the piston may be advantageously constructed is illustrated in the accompanying drawing, wherein Figs. 1 and 2 are vertical cross sectional views at right angles to one another;

Fig. 3 is a horizontal sectional view on the line 3—3 of Fig. 1;

Fig. 4 is a horizontal sectional view on the line 4—4 of Fig. 2;

Fig. 5 is a plan of Fig. 2.

In the illustrative construction, 1 represents an inner piston portion formed with a single top wall 2 and shouldered at 3 and 4 to engage shouldering 5 and 6 on the outer or main portion 7, the latter having piston rings 8 therein as ordinarily. Uniting these is a connecting bolt 9 which may have a conical head 10 fitting in a complementary recess in the outer piston portion 7. Said bolt 9 passes freely through an opening 11 in the shouldered part 5 of said outer portion 7 that engages the shoulder 3 in the top of the inner piston portion 1, as well as through an opening in said top (2) of the inner member, its screw taking into a nut 12 held loosely in place by suitable collar bolts 13. The tip ends of the collar bolts 13 fit loosely into holes in the main piston portion 7 so that the latter cannot rotate in relation to the inner portion 1. The construction generally, with the central bolt connection and clearances, allows for any axial differential expansion as well as a diametric differential expansion between the outer and inner portions 7 and 1, due to differences of temperature or in coefficients of expansion of these parts.

The aforesaid single central connecting bolt 9 facilitates the removal of the wearing portions of the piston for inspection or cleaning and for replacement of the piston rings without necessitating the removal of the entire engine piston and connecting rod, and it furthermore eliminates any need of recesses, studs or nuts on the outer surface of the piston and prevents short circuiting of the air about the cylinder ports, or the possibility of loose nuts entering the various ports in the case of two cycle engines.

The head 10 of the central bolt 9, however shaped, can be conveniently used as a hot spot at the top of the stroke if adjacent to the fuel sprays from a centrally disposed fuel valve so as to have a heating effect on the fuel spray emerging from the nozzle and so reduce ignition lag. The top of the bolt head may be covered by a plate 14 of heat-resisting steel, which in addition to protecting the bolt head can be maintained at a higher working temperature due to its greater heat insulation.

The plate 14 is formed with a screw threaded tip piece 15 by which it can be fixed into the bolt head 10, the latter having two tommy holes 16, one of which extends right through the head 10 and is screw-threaded for a certain length to receive a locking screw 17, the tip of which latter enters an extension of said hole in the head 10 while its head remains in a hole in the plate 14. In this way the bolt 9 is prevented from rotating in relation to the part 7 and the plate 14 is similarly held against rotation in relation to the bolt.

This improved piston is intended for use chiefly when oil cooling is desired, the cooling oil being then introduced via the gudgeon pin (not shown) to spaces 18 at the top and sides between the outer and inner portions 7 and 1 of the piston designed to give a high velocity cooling effect with an absence of ribs or pockets, the flow into said spaces being, for instance, through passage 19 and out of said spaces by passage 20.

The piston head and skirt embodied in the main or outer portion 7 are integral so that, when assembled, no oil leakage from the gudgeon pin holes or other oil joints can occur onto the cylinder liner. The said outer portion 7 is circular in cross section throughout, with all parts concentric to prevent distortion, and is thus easily machinable.

What I claim is:—

1. An engine piston comprising, an outer shell incorporating a head and piston skirt and carrying piston rings, an inner structure receiving and supporting the gudgeon or wrist pin, and a single central bolt connecting the outer shell and inner structure together; said outer shell having shoulders engaging with shoulders on the inner structure in such manner as to provide a space between the two through which cooling oil conducted by way of said gudgeon or wrist pin may circulate, and said bolt connecting the two parts through openings in the top of each and secured loosely by a nut having collar bolts holding it against the inner structure in place.

2. An internal combustion engine piston comprising, an outer shell incorporating a head and piston skirt and carrying piston rings, an inner structure receiving and supporting the gudgeon or wrist pin, and a single central bolt separately connecting the outer shell and inner structure together so that the outer shell may be removed while the inner structure remains in place; said outer shell having shoulders engaging upon shoulders in the inner structure with a spacing therearound to admit cooling oil supplied by way of said gudgeon or wrist pin, and said bolt connecting the two parts by passing freely through openings in the top of each and threading into a nut secured by collar bolts on the inner side of the inner structure.

3. An internal combustion engine piston comprising, an outer shell incorporating a head through which the cylinder pressures are transmitted and a piston skirt and carrying piston rings, an inner structure receiving and supported on the gudgeon or wrist pin, and a single central bolt detachably connecting the outer shell and inner structure together so that the outer shell may be removed while the inner structure is left in place; said outer shell having top and side shoulders engaging upon opposing shoulders formed on the inner structure with a spacing therearound to admit cooling oil supplied by way of said gudgeon or wrist pin, and said bolt connecting the two parts being passed freely through openings in the top of each and threading into a nut secured loosely by collar bolts to the inner side of the inner structure.

4. An engine piston according to claim 2, including a plate of heat resisting steel covering the head of the connecting bolt.

5. For an internal combustion engine, a piston comprising an outer shell in which is incorporated the piston skirt, piston ring grooves and piston head through which the cylinder pressures are transmitted, an inner structure primarily for supporting the gudgeon pin and a single central bolt connecting the outer and inner portions; said connecting bolt having a conical head and its stem passing freely through an opening in the head of the outer shell and through an opening in the inner piston structure, the screw thereof taking into a nut arranged within the piston and held loosely in place by collar bolts.

6. A piston according to claim 1 wherein the space between the outer shell and inner structure extends around the two parts at top and sides and has conduit connection with the journal for the gudgeon or wrist pin in the inner structure for the circulation of cooling oil to and from the same.

7. An internal combustion engine piston comprising, an outer shell of one metal, incorporating a head through which the cylinder pressures are transmitted and a piston skirt and carrying piston rings, an inner structure of another metal receiving and supported on the gudgeon or wrist pin, and a single central bolt detachably connecting the outer shell and inner structure together so that the outer shell may be removed while the inner structure is left in place; said outer shell having shoulders resting upon shoulders in the inner structure with a spacing therearound for the circulation of cooling oil conducted by way of said gudgeon or wrist pin, and said bolt connecting the two parts having a head fitting into the top of the outer shell with its stem passing freely through top openings in both said shell and the inner structure and threading into a nut secured by collar bolts to the inner side of the inner structure; together with a plate of heat resisting metal covering the head of the connecting bolt and providing a hot spot for the piston.

WALTER SCOTT BURN.